United States Patent [19]

Noble et al.

[11] Patent Number: 5,441,639
[45] Date of Patent: Aug. 15, 1995

[54] CONVECTIVE ELECTROHYDRODYNAMIC FLUID MEMBRANES

[75] Inventors: Richard D. Noble; Noel A. Clark, both of Boulder, Colo.

[73] Assignee: The Regents of the University of Colorado, Boulder, Colo.

[21] Appl. No.: 110,409

[22] Filed: Aug. 23, 1993

Related U.S. Application Data

[63] Continuation-in-part of Ser. No. 963,480, Oct. 16, 1992.

[51] Int. Cl.⁶ .............................................. B01D 63/08
[52] U.S. Cl. ................................... 210/243; 210/500.25
[58] Field of Search ............... 210/643, 638, 243, 490, 210/500.25, 500.26

[56] References Cited

U.S. PATENT DOCUMENTS 5,006,211  4/1991  Paleologou et al. ............ 204/301 X

*Primary Examiner*—Frank Spear
*Attorney, Agent, or Firm*—Swanson & Bratschun

[57] ABSTRACT

The present invention describes, an electroconvective liquid crystal membrane (ECLCM), comprised of a fluid layer contained between two gas permeable electrodes, thereby forming a sandwich like configuration. The electrodes separate distinct regions having different concentrations of one or more diffusant species and are capable of being accessed by the diffusant species. The fluid layer is comprised of any fluid in which an electrohydrodynamic (EHD) flow can be induced, including liquid crystals and liquid crystal-like fluids. The present invention encompasses fluid layers comprised of liquid crystals, such as N-(4-methoxybenzylidine)-4-butylaniline (MBBA), or polar solvents such as 2-ethylhexanol (2EH) and diethyl phthalate (DEP). The ECLCM includes means for applying an electric field to the fluid layer such that an EHD flow is induced within the fluid layer. The EHD flow alters the passage of the diffusant species across the ECLCM. The present invention includes a method for separating and purifying molecules.

3 Claims, 8 Drawing Sheets

CONVECTIVE ELECTROHYDRODYNAMIC FLUID MEMBRANES

The invention described herein was funded in part by the National Science Foundation. The United States Government may have certain rights in this invention.

This application is a Continuation-in-Part of U.S. patent application Ser. No. 07/963,480, filed Oct. 16, 1992.

FIELD OF THE INVENTION

This invention relates to membranes containing fluids in which an electrohydrodynamic (EHD) flow is induced, including liquid crystal (LC) and LC-like fluids. A fluid capable of exhibiting EHD flow is contained in a sandwich-like membrane configuration, termed an ElectroConvective Liquid Crystal Membrane (ECLCM). The fluid layer is contained within a structure which is accessible to diffusant molecules. The structure contains means for applying an electric field to the membrane, inducing an EHD flow within the fluid layer and modifying the passage of diffusant molecules across the membrane. The permeation rate of $CH_4$ and $N_2$ through a N-(4-methoxybenzylidine)-4-butylaniline (MBBA) membrane is increased by a factor of fifty upon application of an alternating electric field of 100 V/mm to the fluid. The invention further includes use of polar solvents as the membrane fluid layer, including 2-ethyl-hexanol (2EH) and diethyl phthalate (DEP). The fluid layer can be modified by the addition of other components to enhance the solubility and/or diffusion of selected diffusant molecules.

BACKGROUND OF THE INVENTION

A membrane can be viewed as a semi-permeable barrier between two phases of liquid, gas, or liquid/gas. The membrane acts to prevent contact between the two phases and the semi-permeable nature of the membrane allows restricted diffusion of specific molecules such that a separation takes place. The movement of molecules across the barrier can be restricted in a very specific manner.

An immiscible liquid can serve as a membrane between two liquid, gas, or liquid/gas phases. Different diffusant molecules will have different solubilities and diffusion coefficients in a liquid, and therefore, yield selective permeabilities to achieve a separation (Noble and Way (1987) in Liquid Membranes: Theory and Applications, American Chemical Society 347:1–26). The use of a liquid membrane can result in a larger flux due to the higher diffusion coefficients of diffusant molecules in liquids than in solids. When an AC electric field is applied across a non-conducting liquid membrane, the diffusion flux across the membrane can increase sharply. This increased flux is not caused by an increased current, but by electrohydrodynamic (EHD) mixing (Hoburg and Malihi (1978) Phys. Fluids 21:2118–2119), which is a disordering of the fluid resulting in an alteration of mass transport across the fluid region. In other words, the increase results from a type of convection driven by electrical forces rather than phase changes or by heating of the fluid layer. Convection driven by electrical forces differs from other types of convection, such as free convection driven by gravity, or forced convection driven by mechanical forces (e.g., pressure) (Plonski et al. (1979) J. Membrane Sci. 5:371–374). Full disordering or turbulence of the liquid is obtained with a low AC field strength of 100 V/mm. Liquid crystals (LCs) or LC-like fluids are mesomorphic phase materials exhibiting characteristics intermediate between crystalline solids and true amorphous liquids. LCs are usually composed of strongly elongated molecules with a tendency toward ordering and alignment of the molecules characteristic of solid crystals but retaining relative motion and flow between the crystals. LCs or LC-like fluids retain their mesomorphic phase characteristics up to a transition temperature at which the fluid undergoes a transition to a normal liquid phase. LCs are classified in three categories according to their general symmetry, as nematic, cholesteric, or smectic. Below the transition temperature, the LC fluid exhibits dielectric anisotropy and electric conductivity anisotropy. These anisotropic physical properties can be modified with various physical or chemical agents locally or throughout with great facility, giving rise to numerous technological applications.

Hwakek and Carr (1987) Heat Transfer Eng. 9:36–69, and U.S. Pat. No. 4,515,206, issued May 7, 1985 to E. F. Carr, entitled: Active Regulation of Heat Transfer, used electroconvection to regulate the passage of heat flux through a Nematic Liquid Crystal (NLC), demonstrating a field induced enhancement of effective thermal conduction by a factor of 25. The NLCs are liquids characterized by long range ordering of the long axes of their rod shaped molecules. NLCs, by virtue of their fluidity and intrinsic anisotropy, exhibit dramatic EHD effects at low applied electric fields (de Gennes (1974) *Liquid Crystal*, Oxford Press, London; Chandrasekhar (1977) *Liquid Crystals*, Cambridge University Press, Cambridge: Orsay Group on Liquid Crystals (1971) Mol. Cryst. Liq, Cryst. 12:251). A few hundred volts/mm can generate fully developed turbulent convection in appropriately designated NLCs.

N-(4-methoxybensylidine)-4-butylaniline (NBBA) is a typical liquid crystal having negative dielectric anisotropy. Zn the absence of an applied field, it is at rest and gas transport across the membrane is limited by molecular diffusion in the liquid crystal. When an electric field is applied, charge accumulates at the walls (defects), which are perpendicular to the electrodes. Forces due to the interaction of the electric field with the space charge at the wall tend to shear the sample. When the direction of the electric field is alternating, the walls are always charged in the alternating direction of the director. An AC field of approximately 100 V/mm produces fully turbulent flow. This chaotic flow disorders the NLC, generating disclinations in the molecular orientation field which strongly scatter light, producing the so-called "dynamic scattering" LC electro-optic effect (Berne and Pecora (1976) *Dynamic Light Scattering*, Wiley, New York). The disclination lines generated by EHD flow can be observed optically. The lines form parallel to the flow velocity, indicating the flow of the NLC perpendicular to the electrodes and back and forth between them. As applied, EHD flow mixes the LC layer, convecting dissolved species across the LC layer and forming an eddy diffusion process, thereby enhancing its apparent permeability. There have been several previous studies of electric field effects on gas permeation through liquid layers. Kajiyama and coworkers (Kajiyama et al. (1982) J. Membrane Sci. 11: 39–53; Washizu et al. (1984) Polym. J. 16:307–316; Kajiyama et al. (1985) J. Memb. Sci. 24:73–81; Shinkai et al. (1986) J. Chem. Soc., Chem. Commun., p. 933; Kajiyama et al. (1988) J. Membrane Sci. 36:243–255;

Kajiyama (1988) J. Macromol., Sci. Chem. A25(5–7):5-83–600; Qiao and Wang (1987) Membrane Sci. & Tech. (Ch.) 7:1–7) have demonstrated permeation control in NLCs confined in polymer composite structures, using applied electric fields to orient molecules of the NLC and exploiting the anisotropy of the diffusion coefficients. The use of EHD stirring to facilitate mass transfer across a fluid membrane has been demonstrated by Plonski et al. (1979) Jo Membrane Sci. 5:371). In those experiments, the ion flux through a nonconducting (octanol) film separating aqueous ionic solutions was controlled by a factor of 10 by an applied electrical field. However, the large field required to alter ion flux made the films unstable.

The modification of LC structure has been used in the controlled release of drugs [U.S. Pat. No. 4,513,034 issued Apr. 23, 1985, to R. V. Sparer, entitled: Variable Permeability Liquid Crystalline Membrane; U.S. Pat. No. 4,968,539, issued Nov. 6, 1990, to Aoyagi et al., entitled: Liquid Crystal Membranes]. Sparer describes a LC layer contained in a porous structure which provides access to the LC layer to different molecules. The flow of solutes or permeants through the membrane is regulated through application of electric, thermal, or magnetic fields, which serve to alter the phase of the LC. For example, an electric field with a strength of 300–500 volts per centimeter causes the liquid crystal layer to change from the cholesteric to the nematic phase at room temperature. The membrane of Aoyagi et al. is comprised of a hydrophobic polymer membrane upon which is immobilized a liquid crystal-forming compound which has a transition temperature between 25°–45° C. A heating member applies an electric field to the LC layer, heating the LC layer above the gel/LC transition temperature, resulting in diffusion of a drug out of a drug reservoir layer.

In one configuration of a liquid membrane, a liquid is impregnated in the pores of a porous solid for mechanical support. This form is commonly known as an immobilized liquid membrane (ILM) (Noble and Way (1987) supra). The ILM has been recognized as an effective technology to simplify the process of creating an interface between two phases and recovering the products of separation. Selective transport across the ILM can be facilitated by carriers. However, there are two primary problems associated with the use of ILMs. Solvent loss can occur through evaporation, dissolution, or large pressure differences forcing solvent out of the pore support structure. Further, carrier loss can occur due to irreversible side reactions or solvent condensation on one side of the membrane. Pressure differences can force the liquid to flow through the pore structure and leach out the carrier (Noble et al. (1989) Chem. Eng. Prog. 85:58–70). These problems decrease the ILM's lifetime and have limited its successful commercialization.

As stated above, the use of a liquid phase can enhance the solute flux due to the higher coefficients in liquids than in solids. Further enhancement can be accomplished by using a nonvolatile carrier in the liquid (King (1987) Chapter 15 in Handbook of Separation Process Technology (R. W. Rousseau, ed.), Wiley-Interscience Publishing Co. This carrier molecule can selectively and reversibly react with the solute. This reversible reaction provides a means of enhancing the solute flux and improving the selectivity at the same time. By combining the advantages of high diffusion coefficients in liquids with the added carrying capacity of the carrier, larger fluxes can be obtained in liquid membranes than in polymer membranes. The selective nature of the carrier provides much better separations than those obtainable solely on relative solubility and diffusion.

Electrochemical processes have been used for chemical separations (Newman (1973) Electrochemical Systems. Prentice-Hall, Englewood Cliffs, N.J.). The most general applications are electroplating of metals in the processing of ores and the formation of metal coatings. In cases where a redox process altered the thermodynamics of a reversible complexation reaction, electrochemical cycles have been devised that result in separation for different species. Koval et al. (1988) Separat. Sci. Technol. 23:1389–1399, devised a mechanism that combines electrical energy and reversible complexation for the removal of sulfur and nitrogen compounds from a feed organic phase and subsequently concentrates them in a receiving organic phase using an equilibrium stage process. The core of their separation process is the reversible reaction between complexing agents (or carriers) and the sulfur and nitrogen compounds. The process which uses electrochemistry to modulate the complexation reaction is termed Electrochemically Modulated Complexation (EMC).

In an EMC process, a complexing agent, dissolved in the contacting (aqueous) phase, is electrolyzed to its high solute affinity redox state. The solute is extracted from a feed phase by partitioning into the contacting phase via reaction with the complexing agent. The complexing agent is then electrolyzed to its low solute affinity redox state and the solute partitions into the receiving phase upon contact with the aqueous phase. The contacting phase is then recycled.

In the EMC process, the complexing agent must meet four requirements: (1) it must be soluble only in the contacting (aqueous) phase in order to prevent any loss; (2) it must have a solute binding site and it must undergo a chemically reversible redox cycle in the presence and absence of the solute; (3) a considerable difference must exist in the affinity of the solute for the complexing agent in its two oxidation states; and (4) the kinetics of the solute-complexing agent reaction should be sufficiently rapid with respect to interfacial mass transfer. Complexing agents which meet these requirements include metal chelates which reversibly bind gases like $CO_2$, $CO$, or $H_2S$. These metal chelates contain iron, copper, or cobalt (e.g., primary transition metals). Suitable complexing agents include iron or copper porphyrins which are soluble in an organic phase and contain a metal center.

BRIEF SUMMARY OF THE INVENTION

The fluid membrane described herein, termed the electroconvective liquid crystal membrane (ECLCM), is comprised of a sandwich-like configuration in which a structure contains a fluid layer comprised of a fluid in which EHD flow can be induced. The structure containing the fluid layer separates distinct regions having different concentrations of one or more diffusant species and is capable of being accessed by the diffusant species. The ECLCM further includes means for applying an electric field to the fluid layer such that an EHD flow may be induced within the fluid layer. The EHD flow alters the passage of the diffusant species across the ECLCM.

The fluid layer can be modified by the addition of other components which act as carriers to the passage of selected diffusants. These additional components move in the EHD flow and can be chemically bonded to the fluid layer, added as dopants into the fluid layer or may be separate solid or liquid phases of other materials not soluble in the fluid layer.

The membrane of the present invention can function in an EMC process wherein a complexing agent is added to the fluid layer and electrolyzed to high and low affinity redox states for separation of different molecular species.

The invention includes a method for separating molecules. Further, the invention includes a method for controlling the transport of compounds across a membrane by the addition of specific dopant species to the ECLCM.

The membrane of the present invention is comprised of a fluid layer in which EHD flow can be induced. The present invention encompasses fluid layers comprised of liquid crystals, including N-(4-methoxybenzylidine)-4-butylaniline (MBBA), or polar solvents, such as 2-ethylhexanol (2EH), and diethyl phthalate (DEP). The present disclosure demonstrates that polar solvents, such as 2EH and DEP, may be effectively used in place of a liquid crystal such as MBBA.

DETAILED DESCRIPTION OF THE PREFERRED EMBODIMENTS

Figure 1:
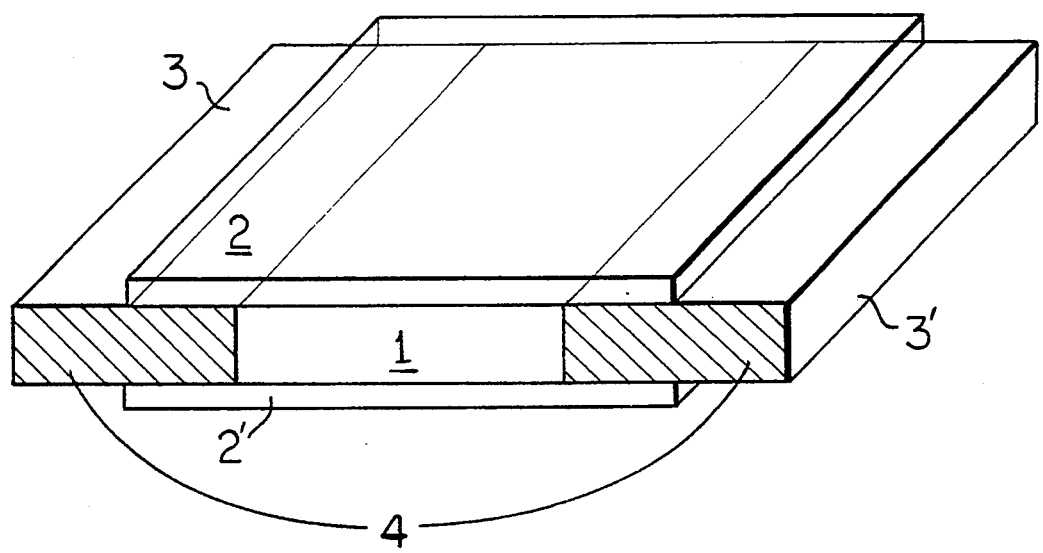
FIG. 1 shows the setup used to observe the convective motion of liquid crystals in an electric field. The distance between the electrodes is 1.5 mm, and between the glasses is 75 microns.

A novel immobilized fluid membrane is described herein, termed the ElectroConvective Liquid Crystal Membrane (ECLCM). The ECLCM is a sandwich-like membrane configuration in which a fluid layer comprised of a fluid capable of exhibiting EHD flow is contained in a structure to which diffusant molecules have access. An electric field is applied to the fluid layer to induce an EHD fluid flow, altering and enhancing the diffusion and permeability characteristics of specific molecules across the membrane.

A preferred embodiment of the present invention encompasses a fluid membrane in which certain flow characteristics can be switched on or off. Potentially useful liquids which may comprise the fluid membrane include liquid crystal liquids such as N-(4-methoxybenzylidine)-4-butylaniline (MBBA), and nonliquid crystal liquids such as polar solvents. A potentially useful liquid is herein defined as any liquid in which an EHD flow may be induced. In one embodiment of the present invention, the liquid layer of the ECLCM is comprised of N-(4-methoxybezylidine)-4-butylaniline (MBBA). In another embodiment of the present invention, the liquid layer of the ECLCM is comprised of the polar solvent 2-ethyl hexanol (2EH). In yet another embodiment of the present invention, the liquid layer of the ECLCM is comprised of the polar solvent diethyl phthalate (DEP). Further included in this invention is application of an AC field to the ECLCM to enhance permeability of specific diffusants across the fluid membrane.

The switchable convective fluid membrane concept of this invention makes possible a variety of separation capabilities not available in the current art. The present invention makes possible an electrically controllable filter with a much larger ratio of electric field on to off permeability than is currently available. Such a filter has applications, for example, in dynamic sampling, where the application of voltage is timed with respect to some diffusant producing event.

This invention includes a method for controlling the transport of compounds across a membrane by inducing an EHD flow in a fluid layer contained within a structure wherein the EHD flow alters the passage of diffusant molecules across the fluid membrane. In one embodiment of the invention, a chemical agent is added to the fluid layer to enhance diffusion and separation of specific molecules.

This invention further includes a method for separating molecules by inducing an EHD flow in a fluid layer contained within a structure, the EHD flow altering the passage of specific molecules across the fluid layer.

The configuration of the ECLCM basically consists of two gas permeable electrodes and a fluid layer. This design is very important and separates the present invention from prior art non-gas permeable electrodes, for example, those used in devices to regulate heat flux. The electrodes must be gas permeable and guard against the leakage of the fluid into the pores of the electrodes. The fluid layer is contained between two electrodes forming a sandwich-like membrane structure, which contains the fluid but allows the passage of gas through the membrane. The electrodes enable application of an electric field to the fluid, producing EHD turbulence and mixing of the fluid layer, facilitating mass transport through the membranes.

For this permeability enhancement mechanism to be effective, the membrane structure requires that the gas permeability of the electrodes be large compared to that of the liquid crystal layer at rest. Thus, the barrier layers on them are ideally either thin compared to the fluid layer or materials of higher permeability or both. In one embodiment, this membrane may be used as a "switch" to rapidly transport solutes to a sensing element while protecting the sensor from the gas environment. The signal (solute concentration) to the sensor can be further enhanced by the addition of a complexing agent in the membrane which selectively and reversibly binds with the solute of interest (facilitated transport).

The important advantages of the present invention are achieved by the use of the EHD flow rather than through the use of a change of order or phase. The present invention differs from membranes of the prior art in that it uses an electric field to induce a flow to disorder the fluid which results in the alteration of mass transport across the fluid region, whereas the prior art applied the electric field to enhance the order in a liquid crystal layer.

In contrast to the Sparer membrane (supra), the present invention does not involve either a phase change or heating of a fluid layer. Because the present invention makes use of fluids capable of exhibiting EHD flow, much less energy input is required and there is no resulting heat induction of the fluid membrane. Additionally, the present invention is directed to a method of separating molecules, not to a method of controlling drug delivery as taught by the Sparer patent. In contrast to the Aoyagi invention (Supra), the present invention uses the application of an electric field to induce EHD flow in a fluid capable of exhibiting EHD flow, rather than using electricity to generate heat. The permeability characteristics of the present invention are not the result of either a phase change or heating of the fluid layer. Further, the present invention teaches the enhancement of the passage of specific diffusants by addition of other components to a fluid layer capable of exhibiting EHD flow, including complexing agents with high affinities for specific molecules for selective enhancement and separation of such molecules.

Select fluids can exhibit a variety of EHD effects, in which an applied electric field induces flow of the fluid coupled with molecular reorientation and electrical current. The EHD flow does not result in a phase change in the fluid. In certain fluid materials, like the thermotropic fluid nematics, the EHD effects can be quite pronounced, with electric fields of a few volts/micron producing fully turbulent flow. This turbulence is well known in the art to make the fluid highly scattering to visible light, leading to the concept of the "dynamic scattering" mode of liquid crystal electro-optics. EHD effects have been widely studied in nematics and are discussed in the standard texts on liquid crystals (P. G. deGennes (1974) *Liquid Crystals*, Oxford Press, London); B. S. Chandrasekhar (1977) *Liquid Crystals*, Cambridge University Press, Cambridge).

EHD flow appears at a well-defined electric field threshold as a periodic pattern of cells of vortex-like steady-state fluid motion. As the field strength is increased, a sequence of additional instabilities leads first to oscillatory flow which is periodic in time, then, at higher fields, quasi-periodic in time, and then, at the highest fields, chaotic fully developed turbulent flow, having a local fluid velocity that changes on length and time scales which decrease as the field strength is increased.

A variety of factors are known to enhance the EHD effect. For example, fluid material with negative dielectric anisotropy generally favors a low threshold for initial instability. Additionally, some doping of the fluid with ions is beneficial. There are several commercially available liquid mixtures developed for dynamic scattering applications in which EHD turbulence can be generated with electric fields of about 1 volt/micron. EHD flow should also be achievable in many of the lyotropic liquid crystal phases in which rod or lamellar shaped micellar aggregates orientationally order.

To illustrate the advantages of using EHD-induced flow to facilitate transport, EHD-induced flow can be compared to gradient-driven diffusive transport. In gradient-driven diffusive transport, a concentration difference sets up a diffusant concentration gradient in the fluid and thereby a gradient-driven diffusant flux. If $c_1$ and $c_2$ are the concentrations of a diffusant molecule in the adjacent phase on either boundary of a fluid layer of thickness t, D is the diffusion constant, and S is the partition coefficient between the fluid phase and the adjacent phase, the steady-state flux from the higher to the lower concentration is described by the equation:

$$J_t = SD(c_2 - c_1)/t$$

The effect of EHD-induced flow is most easily visualized by considering fully developed turbulent flow. In this situation, the fluid motion homogenizes the concentration in the center of the fluid, described by the following equation:

$$c_m = S(c_1 + c_2)/2$$

Near the surfaces of the fluid layer, the flow will be suppressed by the boundary condition at the substrates, leaving a boundary layer across which the concentration gradients will appear. At sufficiently high electric field strength, the boundary layer will be of a thickness that is small compared to the fluid thickness t, in which case the gradients will be large compared to that noted above in the absence of flow. The diffusive flux will now be given by the equation $$J_b = SD(c_2 - c_1)/2b = J_t T/2b$$

which is larger than $J_t$ by the factor t/2b. With typical nematic liquid crystal materials developed from EHD flow, b comparable to 1 micron should be achievable. Thus, for a 50 micron thick fluid layer, flux ratios of $J_b/J_t$ of about 25 can be achieved. As the applied field is lowered, the flux ratio will decrease, approaching 1 as the threshold of the first instability to steady flow is approached.

EHD-induced flow can be achieved not only in nematic liquid crystal media, but also in such media in which other monomolecular, polymeric, or particulate components are mixed. This leads to a variety of additional means of employing EHD flow in fluid membranes. For example, chemically specific agents can be incorporated in the fluids which exhibit high affinity for a particular diffusant. In an EHD-induced flow, the particles will be convected back and forth across the fluid layer, picking up diffusant on one side and depositing it on the other. This method offers the significant advantage of flexibility of chemically specific agent selection for particular diffusant application.

A second important class of applications of the present invention exploits the differences in the partition coefficient of various diffusant molecules in the fluid region. A principal means known in the art of separating one molecular species from another in a mixture is to contact the mixture with a second phase in which one of the species is much more soluble. Higher solubility (S) means larger concentrations in the fluid and thereby larger flux (J), using the above arguments. The use of EHD induced flow can markedly enhance the performance of such selective membranes by employing the flow to increase the effective diffusion coefficient (D), as discussed above. Thus, the separation factor (ratio of SD for two components) becomes the ratio of S for the two components as D approaches the same value for each component. The product SD is normally termed permeability. The solubility in the fluid medium will provide selectivity while the EHD flow maximizes flux through the membranes.

In a non-limiting example, a complexing agent (carrier) is added to the fluid phase with particular affinity for some selected diffusant. Since either an aliphatic-aromatic or partially aqueous lyotropic liquid crystal solvent can be chosen, a wide variety of complexing agents can be incorporated into the fluid region. For example, the particles can be catalytic. Thus, a reaction and a separation can take place within the structure. One specific example of such particles would be zeolites.

The complexing agent can be added to the fluid phase in several ways. These include dissolution in the fluid and chemical attachment to the fluid molecules. Also, the complexing agent can be attached to solid particles or dissolved in fluid droplets with are dispersed in the fluid phase.

The incorporation of a complexing agent has two the fluid region $c_m$ is increased. This, in turn, distinct advantages. The total solute concentration in increases the solute flux across the fluid membrane. Also, the specificity or separation factor is increased since the solubility of the other components in the feed phase is not increased. The incorporation of a complexing agent in static liquid films is known to increase permeability by producing flux enhancements up to several hundred fold. Typically, the flux enhancement increases as the solute feed concentration decreases. This is due to the large solute transport due to the carrier at low solute driving forces. Mass transport in these systems is diffusion-limited under conditions of large flux enhancement. Thus, the use of EHD flow should provide even larger enhancements.

An additional distinct advantage of the incorporation of a complexing agent in this process is the ability to separate and concentrate solutes. In an EMC process, complexing agents have two oxidation states with large changes in solute binding between oxidation states. The electric field which is used to induce EHD can also be used to perform redox reactions at each electrode. In this manner, the solute can be bound at the feed side of the membrane in one oxidation state of the complexing agent and released on the opposite side (permeate side) in the second oxidation state. Due to change in the oxidation state, solute can be released at the permeate side at a higher concentration than in the feed phase.

The nematic liquid crystal N-(4-methoxybenzylidine)-4-butylaniline (MBBA) is characterized by long range ordering of the long axis of the rod shaped molecule due to fluidity and intrinsic anisotropy. As shown in the examples provided, MBBA exhibits dramatic electrohydrodynamic effects at low applied electric fields. However, there are two important obstacles to the commercial use of MBBA. One of these is the price. MBBA is considerably more expensive than organic solvents such as 2EH.

The second obstacle to the commercial use of MBBA is chemical stability. MBBA contains a very polar C=N bond between the two phenyl rings forming its core (Winkle et al. (1990) Mat. Res. Soc. Symp. Proc. 177:311). Free charges can cause dissociation at the phenyl-phenyl linkage. In addition, if water is present, some is always dissociated into $H_3O^+$ and $OH^-$ which can hydrogen bond with this polar core and cause the molecule to break. Consequently, moisture in the feed gas stream can cause degradation.

A candidate for the liquid phase of the membrane of the present invention should have the following properties: (1) it must be electroconvective; (2) it must be stable in air; (3) it should exhibit a high selectivity for gas separation; and (4) it must be compatible with the barrier film between the fluid and electrodes. Three candidates for the liquid phase of the membrane of the present invention were selected, 2EH, 1-octanol, and DEP, on the basis of published acid gas separation data (U.S. Pat. No. 4,737,166).

The use of EHD stirring to facilitate mass transfer across a fluid membrane, other than a liquid crystal membrane, has been demonstrated (Plonski et al. (1979) supra). Ion flux through a non-conducting film (1-octanol) separating aqueous ionic solutions was controlled over a factor of 10 by an applied electrical field. However, the electric field required for convection made the films unstable.

The fluid membrane of the present invention is described in Example 1. Example 2 describes the determination of permeation flux differences for two individual gases, $CH_4$ and $N_2$. Example 3 describes the permeability of $CH_4$ and $N_2$ through the ECLCM. Example 4 describes the permeability and selectivity of polar solvents for $N_2$, $H_2$, $CH_4$, and $CO_2$. Example 5 describes the measurement of the surface tension of MBBA and the three candidate polar solvents. Example 6 describes the measurement of the swelling of silicon rubber (SR) films in MBBA and three polar solvents. Example 7 describes the electroconvectivity of the candidate polar solvents.

A polar solvent which can be used to replace the liquid crystal MBBA in an electroconvective liquid membrane must be an insulating liquid. The examples shown below demonstrate that if the conductivity of a liquid is in the order of $10^{-10}$ $ohm^{-1}cm^{-1}$, the solvent can exhibit stable electroconvectivity.

When the AC conductivity of a polar solvent at 60 Hz frequency is larger than $1 \times 10^{-10}$ $ohm^{-1}cm^{-1}$, it is primarily due to ionized impurities in the solvent. An ion exchange based technique may be used to deionize the polar solvent. With this technique, a mixed bed composed of strongly acid and basic ion exchange resins is employed for the removal of the ionized impurity, and molecular sieve beads are used to dehydrate the polar solvent. This treatment results in reduction of the dielectric constant as well.

Diethyl phthalate (DEP) was tested as a candidate electroconvective solvent. The dielectric constant is in the 5-15 range, its boiling point is 298° C., and selectivity for $CO_2$ from $H_2$ is superior to that of MBBA. The retail price of DEP is less than 1/100 of that for MBBA, and the SR barrier film is very stable. The conductivity of the commercial product (Aldrich) is in the order of $10^{-9}$ $ohm^{-1}cm^{-1}$, and is reduced to $10^{-10}$ $ohm^{-1}cm^{-1}$ after deionization and dehydration. DEP exhibited stable electroconvectivity after deionization and dehydration. The gas permeation of the treated DEP membrane may be enhanced by application of an AC electric field.

Figure 3:
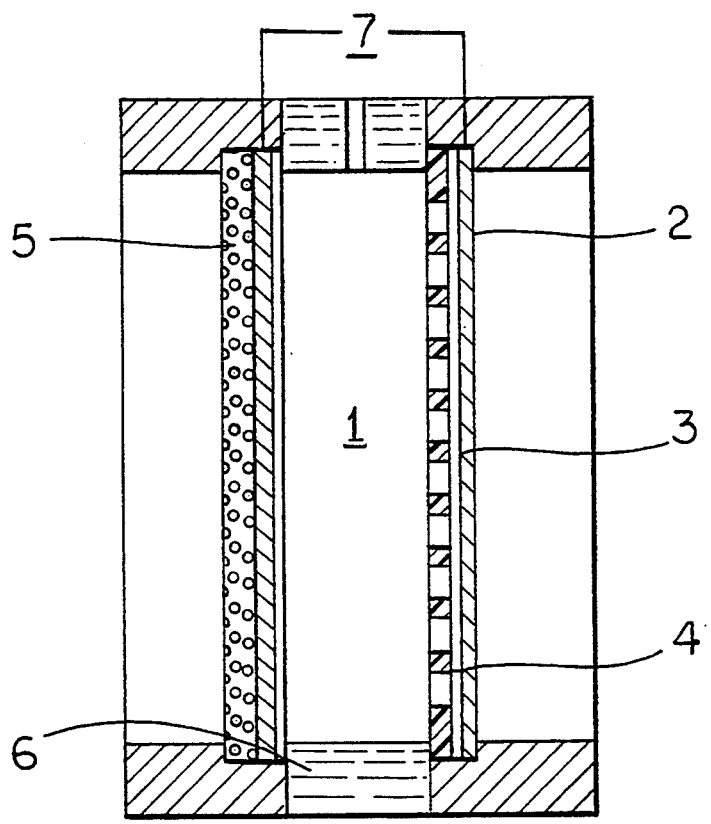
FIG. 3 shows the configuration of the ECLCM cell for differential pressure operation. The diameter of the cell is 35.56 mm, thickness of the PTFE ring is 9.63 mm, and the thickness of the plastic screen is 4.67 mm.

FIG. 1 shows the setup used to observe the convective motion of the liquid crystal or fluid which exhibits EHD flow in an electric field. Glass plates 2 and 2' on each side of the fluid layer 1 are used to observe the convective motion. Brass electrodes 3 and 3' are used to impose the electric field. FIG. 3 shows the configuration of the ECLCM cell for differential pressure operation. The fluid layer 1 exhibits EHD flow. An electrode 2 is on each side of the fluid 1 and is connected to the AC field generator 7. The electrodes are porous to allow rapid gas permeation through that portion of the device. The applied field is located in the space between the electrodes 2. A barrier layer 3 prevents the fluid 1 from entering the pores of the electrodes 2. A plastic screen 4 and SS screen 5 function as mechanical supports which allow a pressure drop to be applied across the device without deflecting the electrodes or attached materials. The PTFE ring 6 is a mechanical support to enclose the fluid layer 1 and is also filled with fluid through an opening on top of the ring. The zero differential pressure system of FIG. 4 has a liquid layer 1 which exhibits EHD flow. Two chambers 2 and 3 are filled with different individual gases at the same volume and pressure. A liquid piston 5 in a pipette was used to measure the volume change in the two chambers. Two electrodes 6 on either side of the fluid layer 1 are connected to the AC field generator 4. The permeation system for an individual gas of FIG. 5 has a liquid layer 1 between two electrodes connected to an AC field generator 2. A small chamber 8 was evacuated with a vacuum 5 and the pressure in it monitored by a low-pressure gauge 3. A constant gas pressure was maintained in large chamber 9 and monitored by a pressure gauge 4. The gas pressure was controlled by a surge tank 7 to which was connected a gas inlet 6.

EXAMPLE 1

The Electro-Convective Liquid Crystal Membrane (ECLCM)

The liquid crystal MBBA was employed because the EHD results on MBBA cells are available (Hwalek and Carr (1987) supra; Winkle et al. (1990) Mat. Res. Soc. Symp. Proc. 177:311–316). The ambient temperature is within the temperature range of its nematic phase. It was also found that its electroconvective flow rate increases with increasing frequency, at constant voltage, to a maximum enhancement at about 40 Hz at room temperature, and the frequency between 25 and 90 Hz is desirable for the enhancement (Winkle et al. (1990) supra). The frequency of the power supply (60 Hz) was chosen in this work, and all the experiments are conducted at ambient temperature, approximately 22° C.

Figure 2A:
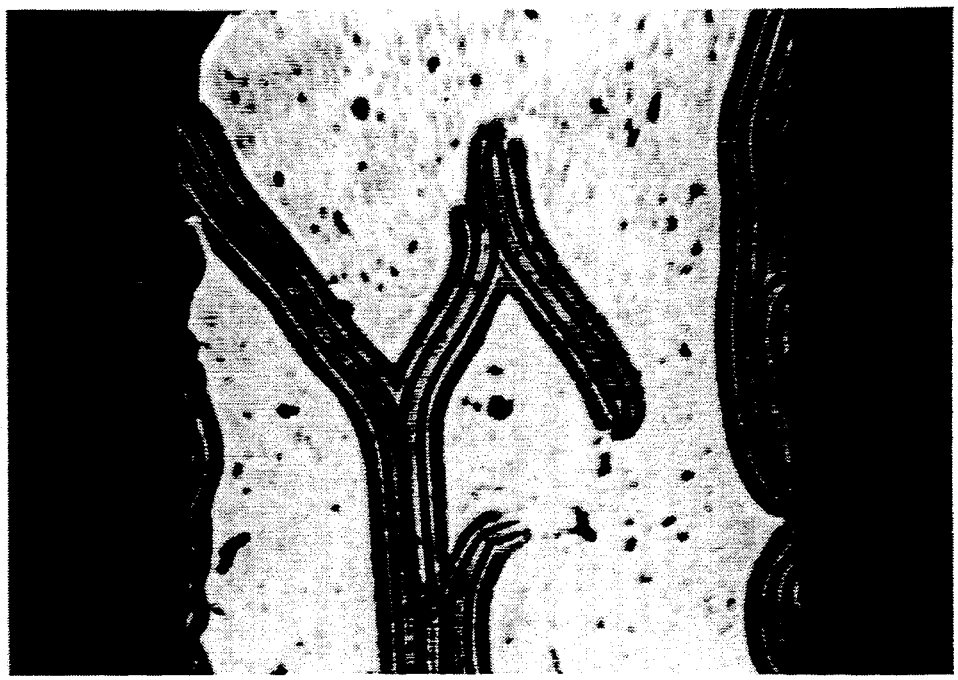
FIG. 2A shows the photomicrograph of the convective motion of MBBA prior to the application of an electric field (0 volts).
Figure 2B:
FIG. 2B shows the photomicrograph of the convective motion of MBBA in an AC electric field 200 volts.
Figure 2C:
FIG. 2C shows the photomicrograph of the convective motion of MBBA in an AC electric field of 600 volts.
Figure 2D:
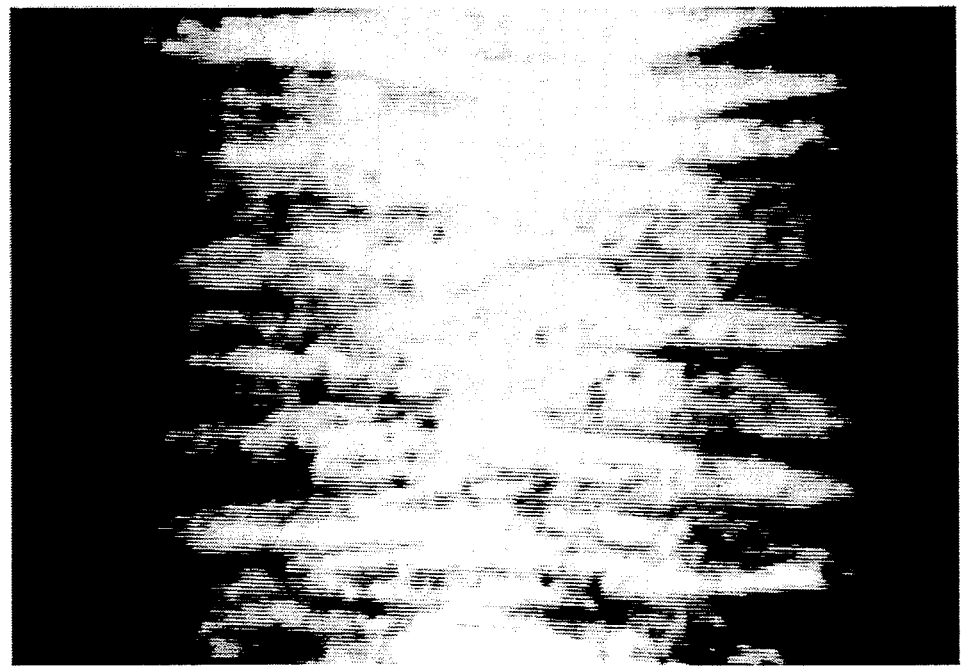
FIG. 2D shows the photomicrograph of the convective motion of MBBA in an AC electric field of 2000 volts.

The cell geometry used to observe the convective motion of liquid crystal in an electric field is shown in FIG. 1. A thin layer of a nematic liquid crystal, MBBA, was contained between two parallel nonporous electrodes spaced 1.7 mm apart. The thickness of the liquid layer was about 75 microns. A representative setup to observe the convective motion of a liquid crystal in an electric field consists of an optical microscope with a polarizer and an analyzer, a CCD camera, a video recorder and a television monitor. A series of photomicrographs at 4 different voltages taken directly from the television monitor are shown in FIG. 2. In the off-state (i.e., no voltage on the cell), the LC molecules were in a state of relative rest and some crystal defects (walls) could be clearly observed (FIG. 2a). When an AC electric field was applied to the LC layer, a distortion and reorientation of the LC molecules alignment was observed. Related with this distortion was a slow circulating cellular flow of the LC (FIG. 2b). Along with the increase of the AC voltage, the cellular flow developed into a convective motion (FIG. 2c) and then a turbulent convective flow was formed (FIG. 2d).

The ECLCM cell is shown in FIG. 3. The nematic liquid crystal is the dielectric in a porous capacitor formed by a pair of porous silver filters coated by an approximately 50 micron thick silicon rubber film on the LC side by a Celgard 2400. For experiments in which a differential pressure is applied across the membrane, a piece of stainless steel screen and another piece of sieved plastic plate were used as the backing of the two electrodes, respectively. The thickness of the fluid layer is about 9.63 mm and that of the sieved plastic place is 4.67 mm. The dimensions of the fluid layer were chosen to insure convection and do not imply an optimal length. The permeation cell could work under more than 930 torr of differential pressure. The silicon rubber film serves as a gas permeable fluid-impermeable barrier which keeps the fluid from filling the pores of the silver electrode. If the fluid were to fill the silver pores, the electrode permeability would be drastically lowered and little electroconvective enhancement achieved.

EXAMPLE 2

Determination of permeation flux difference of two gases using a liquid piston.

Figure 4:
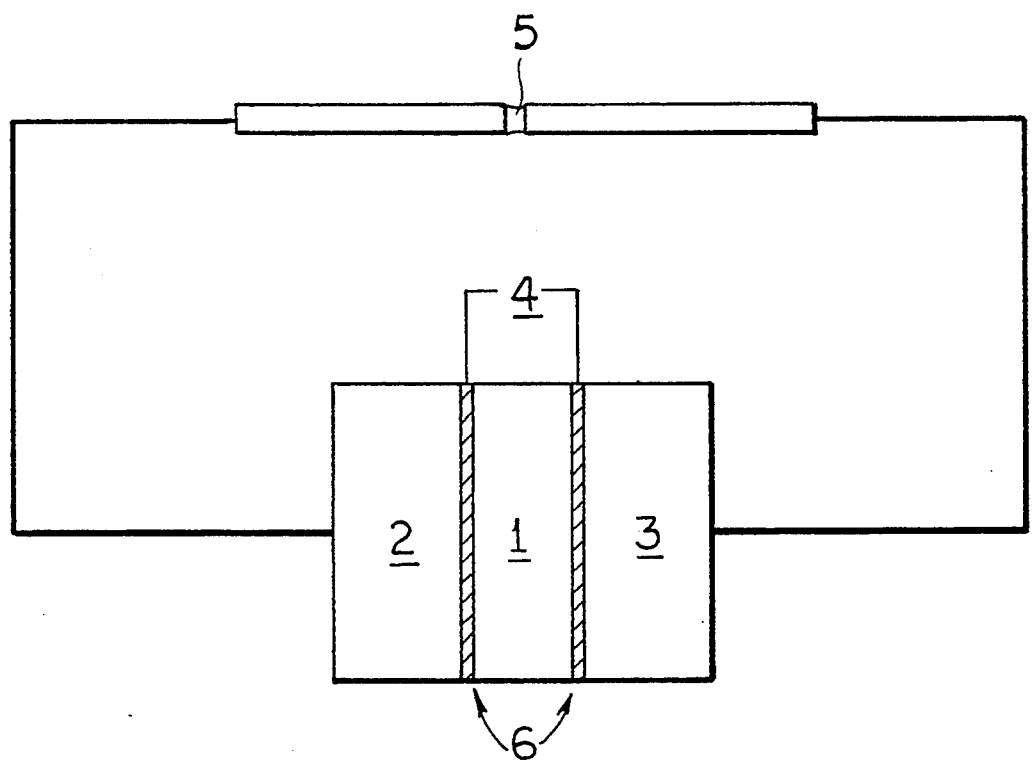
FIG. 4 shows the zero differential pressure system for the determination of permeation flux differences of two gases using a liquid piston.
Figure 5:
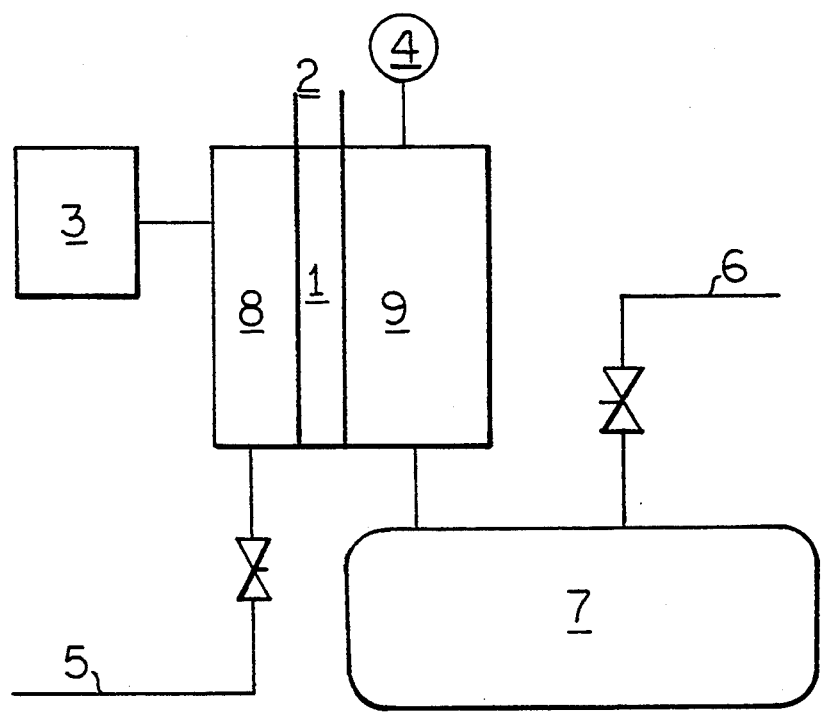
FIG. 5 shows the permeation system for an individual gas.

The initial gas permeation experiments were conducted without any total pressure difference using the system shown in FIG. 4. The thickness of the fluid layer between two silicon rubber coated porous silver electrodes was about 3.5 mm, the diameter of the membrane was 41.5 mm and there was no stainless steel or plastic screen backing for the electrodes. There were two chambers filled with different individual gases, $N_2$ and $CH_4$ respectively, at the same volume and pressure. A liquid piston in a pipette was used to monitor the volume change of the gases in the two chambers. The necessary pressure to drive the liquid piston was less than 0.1 torr. The effect of temperature on the experimental results could be omitted since the chambers were at the same temperature. There was no pressure difference between the two chambers during the experiment.

The permeation flux difference of two individual gases in the two chambers, which is monitored using the liquid piston, can be estimated based on the equation suggested by Henis and Tripodi (1981) J. Membrane Sci. 8:233–246:

$$F_i = Q_i A \Delta P_i / L \quad (1)$$

The $\Delta P_i$ refers to the partial pressure difference of gas i. It is approximately a constant $\Delta P_o$ during the experiment. The gas volume difference observed by the movement of the liquid piston can be estimated by:

$$dV/dt = \tfrac{1}{2}(F_1 - F_2) \quad (2)$$

$$dV/dt = \tfrac{1}{2}(Q_1 - Q_2) A \Delta P_0 / L \quad (3)$$

The gas permeation enhancement can be observed by monitoring the movement of the liquid piston directly. But in fact, the gas permeation resistance of the two electrodes should not be omitted here. It is inconvenient to estimate the permeability of the fluid for individual gases in the electric field based on the results obtained through the zero differential pressure system.

The smaller chamber shown in FIG. 4 was evacuated before starting the experiment, and the gas pressure in it was monitored by a pressure gauge. The gas pressure in the larger chamber was constant ($P_0$) and controlled by a surge tank. The volume of the smaller chamber was a constant $V_0$, and the individual gas pressure in it, $P_i$, which is much smaller than that in the larger chamber, $P_0$, can be estimated using the equations:

$$V_0 dP_i/dt = F_i P_s \quad (4)$$

Substituting for $F_i$:
$$dP_i/dt = Q_i A P_0 P_s / L V_0 \quad (5)$$

When the convection of the fluid is induced, the mass transfer resistance of the fluid layer is extremely reduced. In this case, the resistance of the electrodes has to be considered. A multilayer composite membrane model is effective here. The permeation flux can be estimated according to the total resistance of the membrane which is the sum of the resistance of all the layers (Henis and Tripodi (1981) supra):

$$F_i = -\Delta P_i / R_c + R_b \quad (6)$$

The $R_b$ is determined from gas permeation measurements without an fluid layer and the resistance of the fluid layer is given by:

$$R_c = L / Q_{ci} A \quad (7)$$

The $R_c$ will be reduced as convection is induced in the fluid layer and the $Q_{ci}$, the gas permeability in the fluid layer, can be estimated by:

$$Q_{ci} = L / R_c A \quad (8)$$

The system was operated with a constant feed pressure and vacuum on the downstream side of the membrane. The system was allowed to go to steady-state before any data was collected. Therefore, there was no initial time lag in pressure due to the gas accumulation in the membrane.

Figure 6:
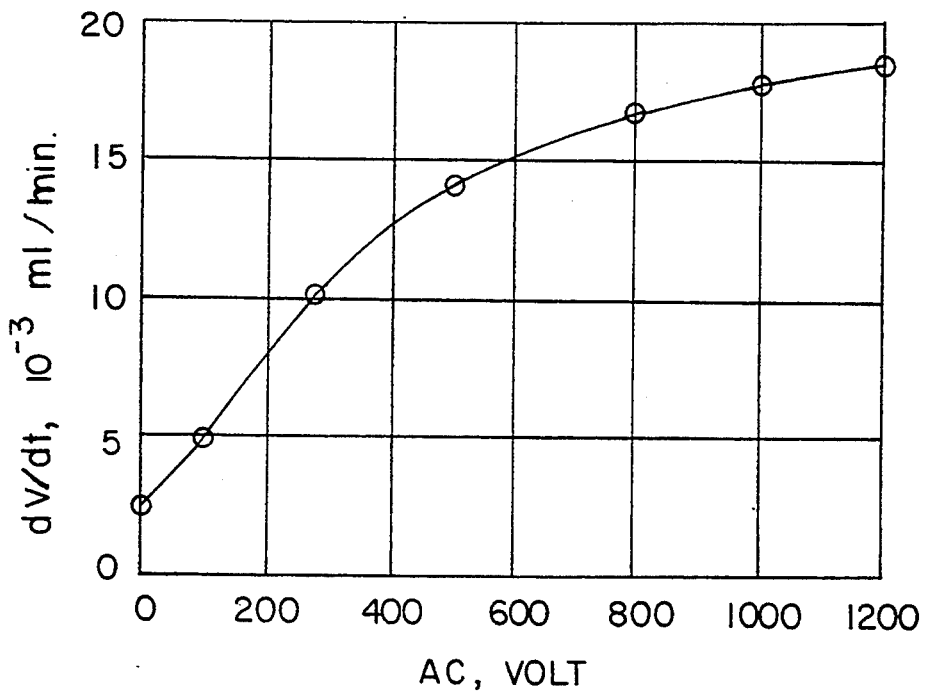
FIG. 6 shows the permeation rate differences of $CH_4$ and $N_2$ obtained by the liquid piston.

The results obtained using the zero differential pressure system of FIG. 4 are shown in FIG. 6. The $CH_4$ permeated preferentially to the $N_2$. When the alternating current voltage reached up to 1300 volts, the permeation flux difference of the two gases increased up to 7 times that measured without an electric field. The total mass transfer resistance of the composite membrane almost reached the value obtained with only the two electrodes alone, that is, at high field the permeation rate of the gases was limited by the resistance of the two porous silver electrodes and its coating of silicone rubber.

EXAMPLE 3

$CH_4$ and $N_2$ Permeability.

Figure 7:
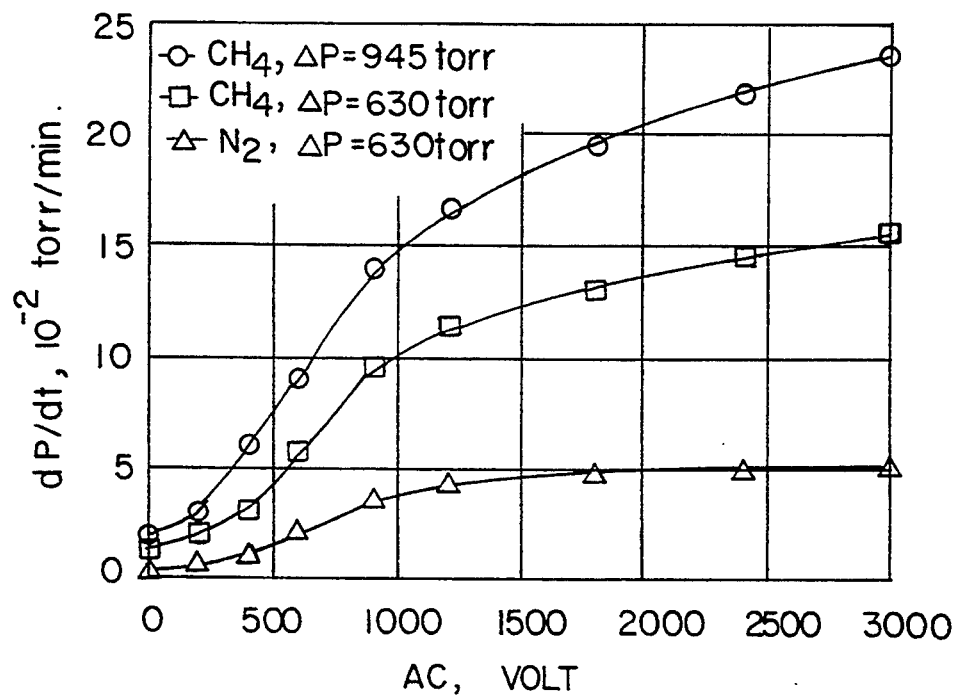
FIG. 7 shows the permeation rate of pure individual gases.
Figure 8:
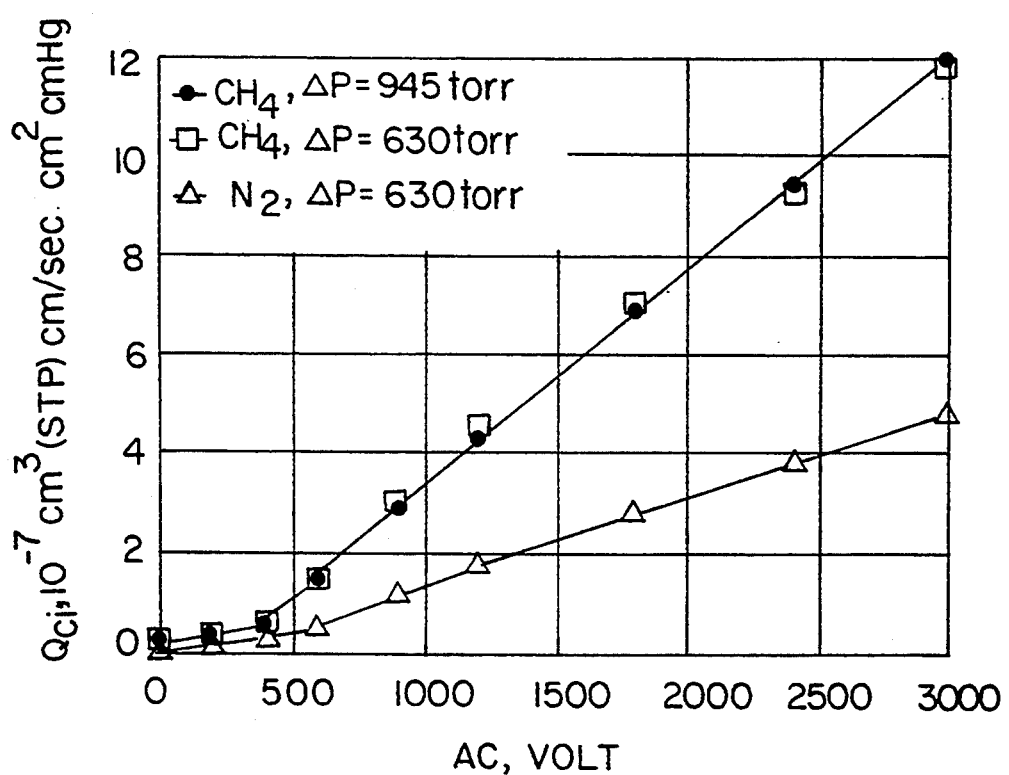
FIG. 8 shows the permeability of MBBA for pure individual gases.

The permeability of $CH_4$ and $N_2$ through the ECLCM under pressure was determined. The results are shown in FIG. 7. The effective permeability of gases through the ECLCM can be enhanced by an alternating current electric field, and that the maximum permeation flux is limited by the electrodes as in the pressure-free case. The gas permeation of the two electrodes without a fluid layer was determined using the same system in same condition. From the results resistance of the two electrodes was calculated to be $5.8 \times 10^5$ sec cm Hg/cm$^3$ for $CH_4$ and $18.6 \times 10^5$ for $N_2$. The permeability of the fluid for $CH_4$ and $N_2$ has been estimated according to equations 4–8. The results are shown in FIG. 8. When the sandwich membrane was in the off state, the gas permeation through the fluid layer was controlled by the molecular diffusion process. The permeability of the fluid layer was about $2.3 \times 10^{-8}$ cm$^3$ (STP) cm/sec cm$^2$ cm Hg for $CH_4$ and $0.9 \times 10^{-8}$ for $N_2$. When the AC voltage was increased to 3000 V, the permeability of the fluid layer was increased by a factor of more than 50, and the resistance of the fluid layer was less than one fourth of that of two electrodes. For this experiment, a defect-free coating is very important for the electrodes. If the fluid soaked into the silicone rubber coating and partly into the silver films, the permeation flux could be reduced.

It can be seen from the results shown in FIG. 8 that the permeability of the fluid layer for $CH_4$ determined under varying pressure differences are the same, and no obvious variation of the selectivity for $CH_4$ from $N_2$ was found at different AC fields. On the other hand, the apparent permeation flow rate (FIG. 7) is directly proportional to the pressure difference and the selectivity of this sandwich membrane is kept between 2.4 and 3.2 which are that of MBBA and silicone rubber, respectively. The total electric current is much less than 0.1 mA. The selectivity of such a sandwich membrane depends on the mass transfer resistance of both the fluid layer and the electrodes:

$$a_{ij} = L_b R_{bj} + L_c R_{cj} / L_b R_{bi} + L_c R_{ci} \quad (9)$$

When the convective effect in the fluid layer is maximized, the permeability of gases in the fluid layer just depend on the gas solubility. The Henry's Law Coefficient of some gases and solvent vapors are shown in Table 1. When the permeability of gases in the fluid is very high, the total selectivity may be controlled by the electrodes.

TABLE 1

| Henry's Law Coefficient of Gases in MBBA | |
|---|---|
| Gas | H [cm$^3$ (STP)/ cm$^3$ cm Hg] |
| $N_2$ | 7.1 E-4 |
| $O_2$ | 1.7 E-3 |
| $CH_4$ | 2.6 E-3 |
| $CO_2$ | 1.3 E-2 |
| $CH_3CH_2CH_3$ | 4.6 E-2 |
| $CH_3CH_2CH_2CH_3$ | 1.1 E-1 |
| $CH_3CH_2OH$ | 1.8 E-1 |
| $CH_3OH$ | 3.7 E-2 |
| $ClCH=CCl_2$ | 1.6 E-2 |
| $HCOOH$ | 2.1 E-2 |
| $CH_3COOH$ | 2.6 E-3 |

EXAMPLE 4

Permeability and Selectivity of Other Select Solvents for $N_2$, $H_2$, $CH_4$, and $CO_2$.

The permeation flux of individual gases through liquid membranes supported by Celgard 2400, under a gas pressure of 405 torr and in the absence of an electric field were determined. The permeability and selectivity of all the candidate solvents are shown in Table 2. The permeability of 2-ethyl-hexanol (2EH), diethyl phthalate (DEP), and 1-octanol was estimated by comparing their permeation flux ($Q_s$) with that of MBBA ($Q_{MBBA}$): $P_s = P_{MBBA} Q_s / Q_{MSSA}$. The selectivity of 2EH and 1- octanol from $H_2$ are the same order of magnitude as that of MBBA, while DEP is higher.

TABLE 2

PERMEABILITY AND SELECTIVITY OF SOME SOLVENTS FOR $N_2$, $H_2$, $CH_4$, AND $CO_2$.

| Solvent | $P_{N2}$ | $P_{H2}$ | $P_{CH4}$ | $P_{CO2}$ | $\alpha_{CO2/H2}$ | $\alpha_{CO2/CH4}$ | $\alpha_{CO2/N2}$ |
|---|---|---|---|---|---|---|---|
| MBBA | 0.9 | 4.0 | 2.3 | 19.2 | 4.8 | 8.33 | 21.3 |
| 2EH | 6.3 | 14.0 | 17.9 | 58.6 | 4.2 | 3.36 | 9.3 |
| 1-octanol | 3.4 | 17.4 | 20.8 | 70.7 | 4.1 | 3.4 | 20.9 |
| DEP | 2.7 | 8.8 | | 54.5 | 6.2 | | 20.2 |

Permeability ($P_2$) is expressed as $\times 10^{-8}$ cm$^3$ (STP) cm/sec cm$^2$ cm Hg. $\alpha_{A/b}$ is the selectivity of gas A from gas B ($P_A/P_B$). The selectivity of 2EH and 1-octanol for $CO_2$ from $H_2$ are in the same order of magnitude as MBBA, while DEP is higher than that of MBBA.

EXAMPLE 5

Measurement of Surface Tension.

The drop-weight method was used to measure the surface tension of the solvents (Wilkinson (1972) J. Colloid & Interface Sci. 40:14). The liquid drop hangs on the opening of a glass pipette due to the surface tension force around the pipette Opening, described by the equation $$\gamma = mg/2\pi r_0 \Psi$$

where $\gamma$ is the surface tension of the liquid in dyne/cm, m is the quantity of mass of a drop in gram, g is the gravitational constant, $r_0$ is the radius of the pipette opening, and $\Psi$ is the empirical correction factor which depends on the ratio of the tip of the radius to the cube root of the volume of the drop. The weight volume of every drop can be estimated by dividing the total weight and volume of the liquid filled in the pipette by the total number of the drops. The experimental system was calibrated with pure water (Lide (1992) in: Handbook of Physics and Chemistry, CRC Press, pp. 6–126).

EXAMPLE 6

Measurement of Swelling of Silicon Rubber (SR) Films.

A barrier layer is required between each electrode and the liquid membrane to prevent wetting of the electrode. The two barrier layers were made of an approximately 25μ layer of a polymer such as silicone rubber (SR). The polymer SR film samples were contacted with the solvents for two weeks, and the degree of swelling was measured to characterize the stability of SR film in the solvents.

TABLE 3

Surface Tension and Swelling of SR in Solvents.

| Solvent | Surface Tension Handbook | Surface Tension Measured | % Swelling |
|---|---|---|---|
| Water | 73.05 | 72.99 | 0 |
| MBBA | | 34.08 | 4.1 |
| 2EH | | 25.11 | 15.7 |
| 1-Octanol | 27.53 | 27.80 | 2.9 |
| DEP | 37.50 | 37.14 | 0 |

The surface tension of water, MBBA, and the three candidate solvents are listed in Table 3. All results are consistent with published values (Lide (1992) supra). DEP has the highest surface tension as compared with the other polar solvent candidates and MBBA. No swelling of SR in DEP was observed.

EXAMPLE 7

Electroconvectivity of Polar Solvents.

Figure 9:
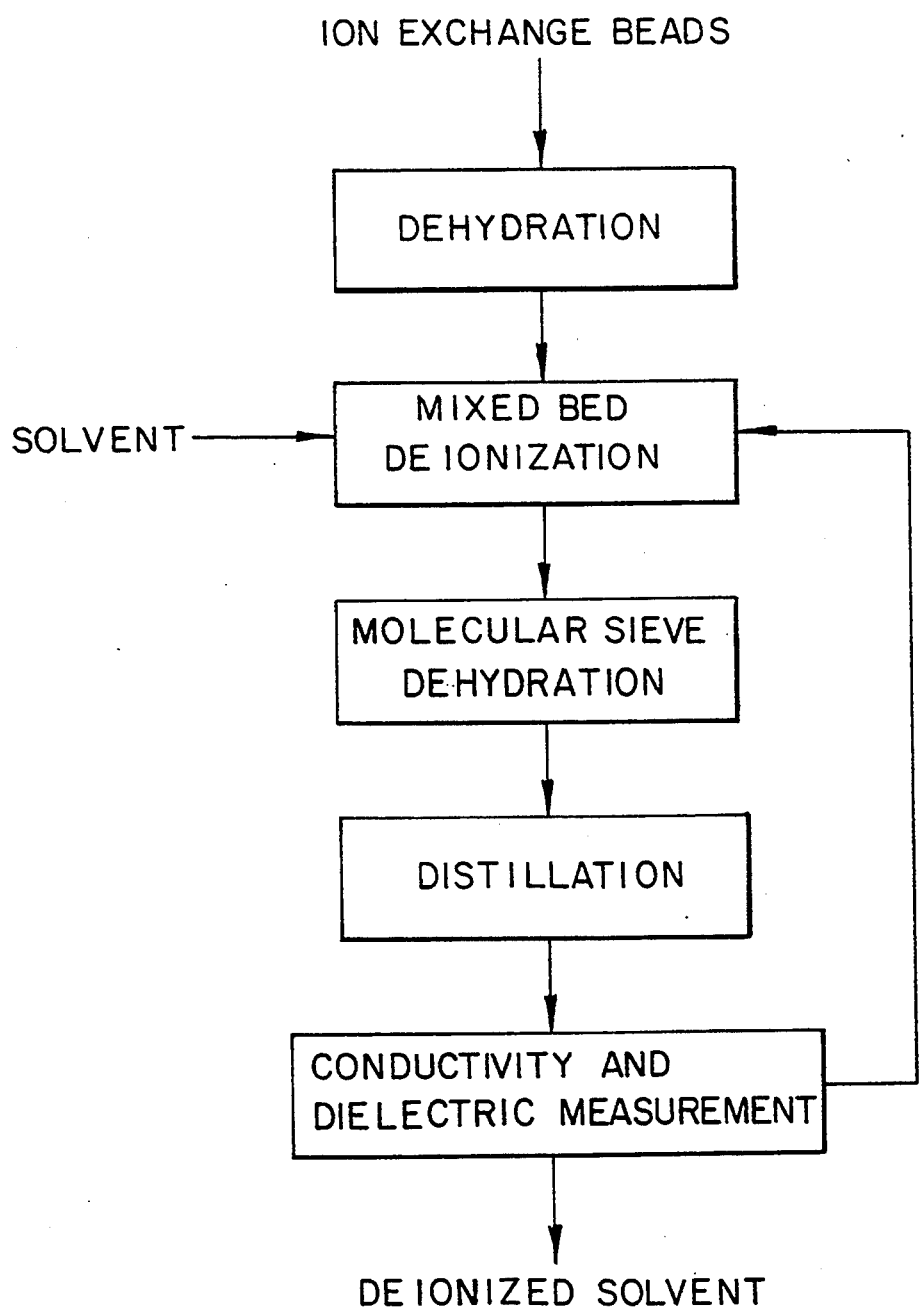
FIG. 9 shows the process flowsheet of the deionization methodology used to remove ionized impurities from the candidate polar solvents.

The conductivity of polar solvents is primarily due to electrolytic impurities. Deionization experiments for the candidate polar solvents were conducted according to the process flowsheet of the deionization methodology shown in FIG. 9. A strong acidic (Amberlyst XN-1010) and basic (A27) ion exchange resin were used for deionizing the polar solvents. The molecular sieve, 3A 1/16-inch beads were used to dehydrate the polar solvents (all reagents from Aldrich Chemical Co., Ltd.). The ion exchange beads were dehydrated by washing off the adsorbed water from the beads with a hydrophilic agent such as ether or dioxane, and drying the beads under vacuum for a minimum of 4 hrs. The deionization step was conducted by contacting 50 ml of the polar solvent with 1 g of cation exchange resin and 1 g of anion exchange resin in a 100 ml Erlenmeyer flask stirring by a magnetic stirrer, for not less than 8 hrs. The dehydration step was conducted in a similar manner with 2 g of molecular sieve beads in the flask. Particles in the solvent were removed by distillation in a Pyrex glass system. The electroconductivity of each candidate solvent is shown in Table 4. di-DEP is deionized DEP. Units of conductivity are ohm$^{-1}$cm$^{-1}$.

TABLE 4

Electroconductivity of Polar Solvents.

| SOLVENT | B.P. (°C.) | CONDUCTIVITY AC, 60Hz, 50V | DIELECTRIC CONSTANT 1000 Hz |
|---|---|---|---|
| 2EH | 183 | $4.4 \times 10^{-10}$ | 6.7 |
| 1-Octanol | 196 | $1.8 \times 10^{-8}$ | 9.4 |
| DEP | 298 | $1.6 \times 10^{-9}$ | 8.0 |
| di-DEP | 298 | $8.8 \times 10^{-10}$ | 7.2 |

The results show that the conductivity of polar solvents such as DEP can be successfully reduced using the ion exchange based methodology described. Further, the results show that the dielectric constant can be reduced as well.

Gas Permeation of DEP.

Figure 10:
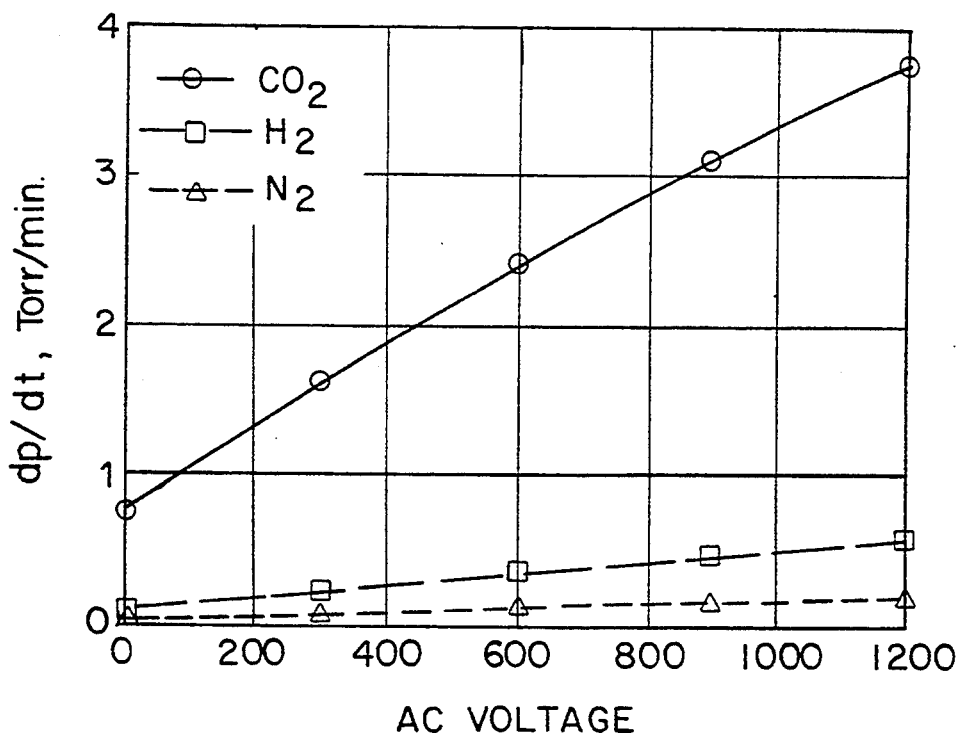
FIG. 10 illustrates the effect of an AC electric field on gas permeation across a diethyl phthalate membrane for $CO_2$, $H_2$, and $N_2$.
Figure 11:
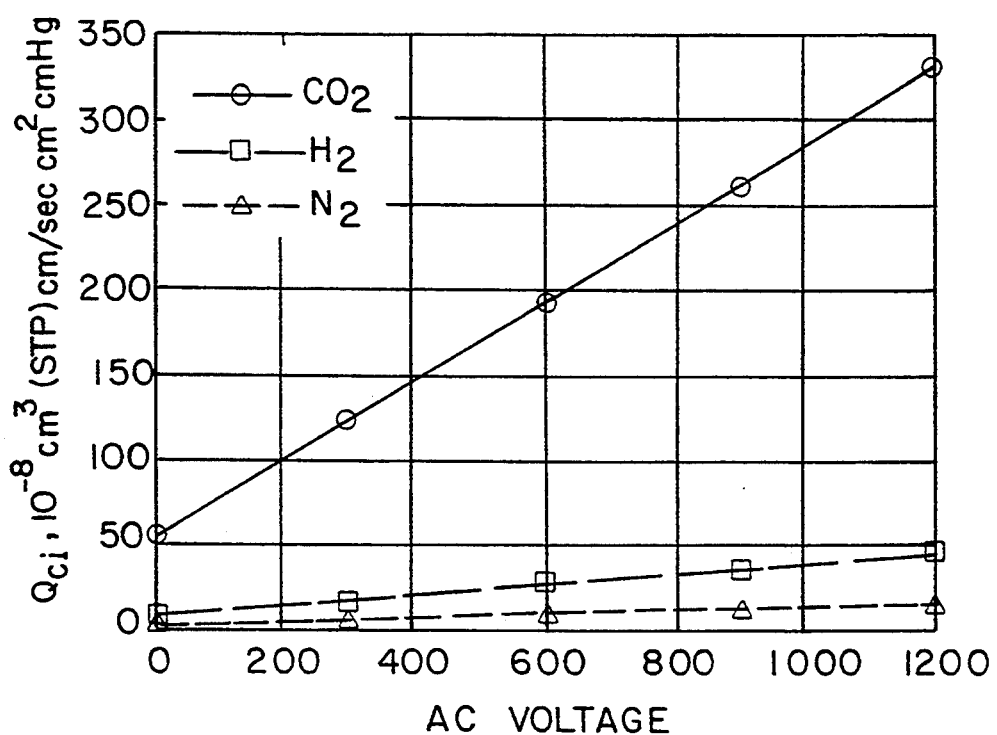
FIG. 11 illustrates the effect of an AC electric field on the permeability of diethyl phthalate.

The electroconvectivity of deionized DEP was demonstrated using the gas permeation methods described in Example 4. The results are shown in FIGS. 10 and 11. The selectivity remains high, but the enhancement, about 6 times at 1200 volts, is not as great as MBBA. That is because the permeability and viscosity of DEP in the resting state is much higher than that of MBBA. If the viscosity is higher, the resistance for the convective motion is increased. Consequently, the voltage required to create turblence is higher.

We claim:

1. A fluid membrane comprising a fluid layer contained between two gas permeable electrodes thereby forming a sandwich-like fluid membrane separating distinct volumes containing diffusant species, said fluid layer comprising a polar solvent capable of exhibiting electrohydrodynamic (EHD) flow, said electrodes capable of being accessed by the diffusant species, and means for applying and electric field to the fluid layer, said electric field inducing an EHD flow within the fluid layer, said flow altering the passage of diffusant species across the fluid membrane.

2. The membrane of claim 1 wherein said polar solvent is 2-ethyl-hexanol (2EH).

3. The membrane of claim 2 wherein said polar solvent is diethyl phthalate (DEP).

* * * * *